US012265279B2

(12) United States Patent
Lee et al.

(10) Patent No.: US 12,265,279 B2
(45) Date of Patent: Apr. 1, 2025

(54) OPTICAL PATH CONVERSION MODULE, AND CAMERA MODULE AND PORTABLE TERMINAL INCLUDING THE SAME

(71) Applicant: Samsung Electro-Mechanics Co., Ltd., Suwon-si (KR)

(72) Inventors: Hong Joo Lee, Suwon-si (KR); Young Bok Yoon, Suwon-si (KR); Ta Kyoung Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 370 days.

(21) Appl. No.: 17/103,132

(22) Filed: Nov. 24, 2020

(65) Prior Publication Data

US 2021/0199918 A1     Jul. 1, 2021

(30) Foreign Application Priority Data

Dec. 30, 2019    (KR) ........................ 10-2019-0177920
May 29, 2020    (KR) ........................ 10-2020-0064792

(51) Int. Cl.
*G02B 7/18*       (2021.01)
*G02B 27/64*     (2006.01)
(Continued)

(52) U.S. Cl.
CPC ......... *G02B 7/1805* (2013.01); *G02B 27/646* (2013.01); *G03B 5/00* (2013.01);
(Continued)

(58) Field of Classification Search
None
See application file for complete search history.

(56) References Cited

U.S. PATENT DOCUMENTS 8,164,827 B2 *   4/2012   Robinson .............. G01J 5/0875
                                                    359/356
9,134,587 B2 *   9/2015   Lim ..................... G02B 27/646
(Continued)

FOREIGN PATENT DOCUMENTS

CN       107533273 A      1/2018
CN       107942605 A      4/2018
(Continued)

OTHER PUBLICATIONS

Korean Office Action issued on Mar. 28, 2021 in counterpart Korean Patent Application No. 10-2020-0064792 (7 pages in English and 6 pages in Korean).

(Continued)

*Primary Examiner* — Derek S. Chapel
(74) *Attorney, Agent, or Firm* — NSIP Law

(57) ABSTRACT

A camera module includes a housing; a lens module accommodated in the housing and configured to adjust focus or adjust focus magnification; and an optical path conversion module accommodated in the housing and configured to convert an optical path. The optical path conversion module includes a prism; a first movable body accommodating the prism; a fixed body accommodating the first movable body; a first driving unit enabling first rotational driving of the first movable body, relative to the fixed body; and a second driving unit enabling second rotational driving of the first movable body, relative to the fixed body.

15 Claims, 11 Drawing Sheets

(51) Int. Cl.
 *G03B 5/00* (2021.01)
 *G03B 13/36* (2021.01)
 *G03B 30/00* (2021.01)

(52) U.S. Cl.
 CPC ............ *G03B 13/36* (2013.01); *G03B 30/00* (2021.01); *G03B 2205/0023* (2013.01); *G03B 2205/0069* (2013.01)

(56) References Cited

U.S. PATENT DOCUMENTS

| | | | |
|---|---|---|---|
| 10,133,152 B2* | 11/2018 | Kang | G02B 7/08 |
| 10,516,773 B2 | 12/2019 | Yoon et al. | |
| 10,678,062 B2 | 6/2020 | Im et al. | |
| 11,245,827 B2* | 2/2022 | Park | H04N 23/57 |
| 11,570,337 B2* | 1/2023 | Park | H04N 23/57 |
| 11,575,812 B2* | 2/2023 | Park | H04N 23/6812 |
| 11,675,156 B2* | 6/2023 | Song | G02B 26/004 |
| | | | 359/824 |
| 2010/0166401 A1* | 7/2010 | Akutsu | G03B 5/00 |
| | | | 359/557 |
| 2014/0002676 A1* | 1/2014 | Ning | G03B 17/14 |
| | | | 235/375 |
| 2018/0109660 A1 | 4/2018 | Yoon et al. | |
| 2018/0217475 A1 | 8/2018 | Goldenberg et al. | |
| 2018/0224665 A1 | 8/2018 | Im et al. | |
| 2018/0231793 A1* | 8/2018 | Jeong | G03B 5/00 |
| 2018/0239161 A1 | 8/2018 | Seol et al. | |
| 2018/0356645 A1* | 12/2018 | Jeong | G02B 27/646 |
| 2018/0364450 A1* | 12/2018 | Lee | H04N 23/55 |
| 2019/0235202 A1* | 8/2019 | Smyth | G03B 5/00 |
| 2021/0263260 A1* | 8/2021 | Jang | H04N 23/6812 |
| 2021/0294184 A1* | 9/2021 | Kim | G03B 17/17 |
| 2022/0035173 A1* | 2/2022 | Min | G02B 7/08 |
| 2022/0100058 A1* | 3/2022 | Lee | H04N 23/55 |
| 2022/0103725 A1* | 3/2022 | Lee | H04N 23/51 |
| 2022/0263981 A1* | 8/2022 | Park | H04N 23/51 |
| 2023/0146039 A1* | 5/2023 | Park | H04N 23/54 |
| | | | 348/208.2 |
| 2023/0161227 A1* | 5/2023 | Kim | G03B 13/36 |
| | | | 396/55 |

FOREIGN PATENT DOCUMENTS

| | | | | |
|---|---|---|---|---|
| CN | 208588884 U | | 3/2019 | |
| JP | 2011-75834 A | | 4/2011 | |
| KR | 10-2018-0041040 A | | 4/2018 | |
| KR | 10-2018-0092251 A | | 8/2018 | |
| KR | 10-2018-0096073 A | | 8/2018 | |
| KR | 10-2019-0072690 A | | 6/2019 | |
| KR | 2019087814 A | * | 7/2019 | ........... G02B 27/646 |
| KR | 2019115624 A | * | 10/2019 | ........... G02B 7/023 |
| WO | WO-2016147433 A1 | * | 9/2016 | ........... G02B 27/64 |

OTHER PUBLICATIONS

Chinese Office Action Issued on Nov. 28, 2022, in counterpart Chinese Patent Application No. 202011594856.8 (8 Pages in Chinese, 9 Pages in English).

* cited by examiner

OPTICAL PATH CONVERSION MODULE, AND CAMERA MODULE AND PORTABLE TERMINAL INCLUDING THE SAME

CROSS-REFERENCE TO RELATED APPLICATION(S)

This application claims benefit of priority to Korean Patent Application No. 10-2019-0177920 filed on Dec. 30, 2019, and Korean Patent Application No. 10-2020-0064792 filed on May 29, 2020 in the Korean Intellectual Property Office, the entire disclosures of which are incorporated herein by reference for all purposes.

BACKGROUND

1. Field

The present disclosure relates to an optical path conversion module capable of precisely driving an optical path converter, and a camera module and a portable terminal including the optical path conversion module.

2. Description of Related Art

A refractive camera module includes at least one prism. The prism is configured to reflect or refract light that is incident in a direction of a first optical axis to a direction of a second optical axis. The refractive camera module may be thinned. For example, a height of the camera module may be lowered in a direction of the first optical axis. The camera module may be configured to minimize deteriorations in resolution that are caused by handshake or tremble. For example, the camera module may include a driving unit capable of moving the prism in a biaxial direction.

A camera module may be mounted in a portable terminal. For example, the camera module may be mounted in a smartphone having a liquid crystal screen. The smartphone may include a magnetic field shielding plate to minimize interference between the liquid crystal screen and a neighboring electronic component. However, the magnetic field shielding plate may be made of metal, and may interfere in the precise driving of the driving unit provided in the camera module.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an optical path conversion module capable of precisely driving a prism without magnetic field interference from an external component, and a camera module and a portable terminal including the optical path conversion module.

In another general aspect, there is provided an optical path conversion module including an optical path converter configured to reflect or refract light, incident along a first optical axis, in a direction of a second optical axis, intersecting the first optical axis; a first driving unit disposed on a side surface of the optical path converter, and being configured to generate driving force to rotate the optical path converter about a first rotation axis, intersecting the second optical axis; and a second driving unit disposed on the side surface of the optical path converter, and being configured to generate driving force to rotate the optical path converter about a second rotation axis, intersecting the second optical axis.

Other features and aspects will be apparent from the following detailed description, the drawings, and the claims.

Figure 1:
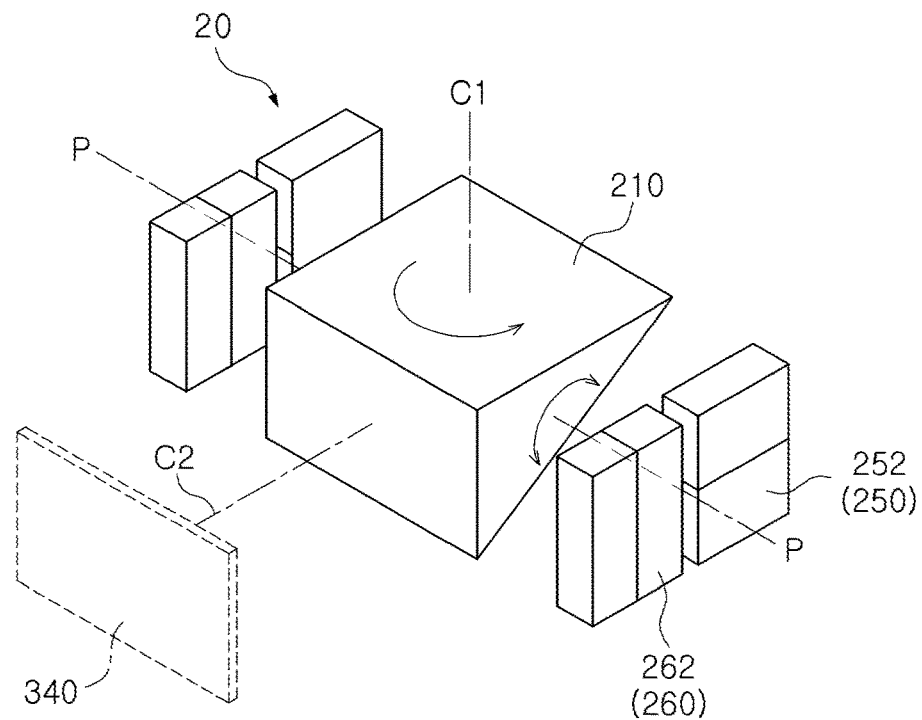
FIG. 1 illustrates an example of an optical path converter.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. As used herein, the term "and/or" includes any one and any combination of any two or more of the associated listed items.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

FIG. 1 illustrates an example of an optical path conversion module.

An optical path conversion module 20 may include an optical path converter 210. The optical path converter 210 converts an optical path of light incident into the optical path conversion module 20. For example, the optical path converter 210 may be configured to emit light, incident along a first optical axis C1, in a direction of a second optical axis C2, intersecting the first optical axis C1. The optical path converter 210 may reflect or refract incident light to convert an optical path of the light. In an example, the optical path converter 210 may be composed of a prism, a reflector, and the like.

The optical path conversion module 20 may match an optical axis of the light refracted or reflected by the optical path converter 210 to an optical axis of the image sensor 340. For example, the optical path conversion module 20 may include a first driving unit 250 and a second driving unit 260, for driving the optical path converter 210. In addition, the optical path conversion module 20 may further include a configuration for receiving or supporting the optical path converter 210. For example, the optical path conversion module 20 may further include a movable body configured to receive the optical path converter 210 and rotate by the first driving unit 250 and the second driving unit 260. In addition, the optical path conversion module 20 may further include a fixed body for receiving the movable body. For reference, the fixed body may be integrally formed with a housing of the camera module.

The first driving unit 250 may be configured to rotate the optical path converter 210 about an axis P, intersecting the first optical axis C1 and the second optical axis C2. The first driving unit 250 may be disposed on one side surface of the optical path converter 210. For example, the first driving unit 250 may be disposed on a left side surface or a right-side surface of the optical path converter 210. The first driving unit 250 may include a first driving magnet 252. A first polarity and a second polarity may be formed in the first driving magnet 252 along the first optical axis C1. For example, an N pole and an S pole of the first driving magnet 252 may be sequentially formed or may be formed at intervals in a direction of the first optical axis C1.

The second driving unit 260 may be configured to rotate the optical path converter 210 around the first optical axis C1. The second driving unit 260 may be disposed on one side surface of the optical path converter 210. For example, the second driving unit 260 may be disposed on the left side surface or the right-side surface of the optical path converter 210. In addition, the second driving unit 260 may be disposed to be parallel to the first driving unit 250 on the left side surface and the right-side surface of the optical path converter 210. The second driving unit 260 may include a second driving magnet 262. A first polarity and a second polarity may be formed in the second driving magnet 262 along the second optical axis C2. For example, an N pole and an S pole of the second driving magnet 262 may be sequentially formed or may be formed at intervals in a direction of the second optical axis C2.

In an example, the optical path conversion module 20, configured as described above, may arrange the first driving unit 250 and the second driving unit 260 on the left side surface and the right side surface of the optical path converter 210, to minimize a height of the optical path conversion module 20 and a height of the camera module in a direction of the first optical axis C1.

Figure 2:
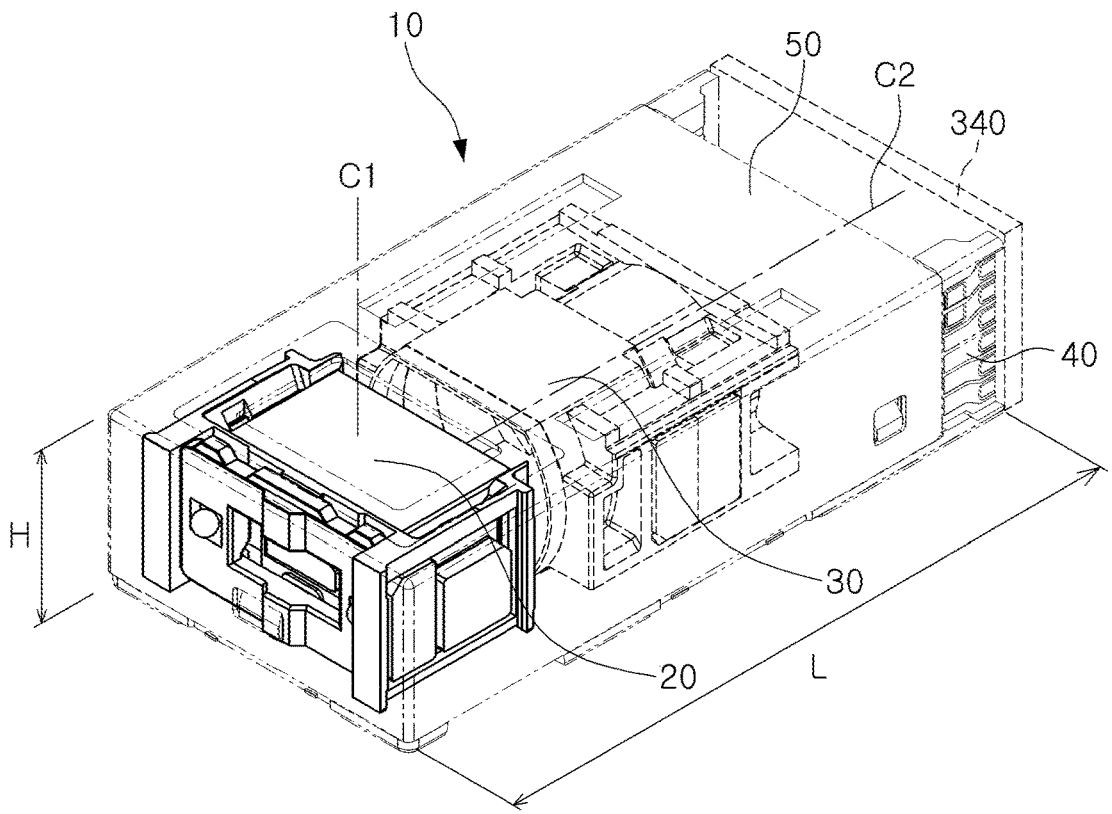
FIG. 2 illustrates an example of a camera module.
Figure 3:
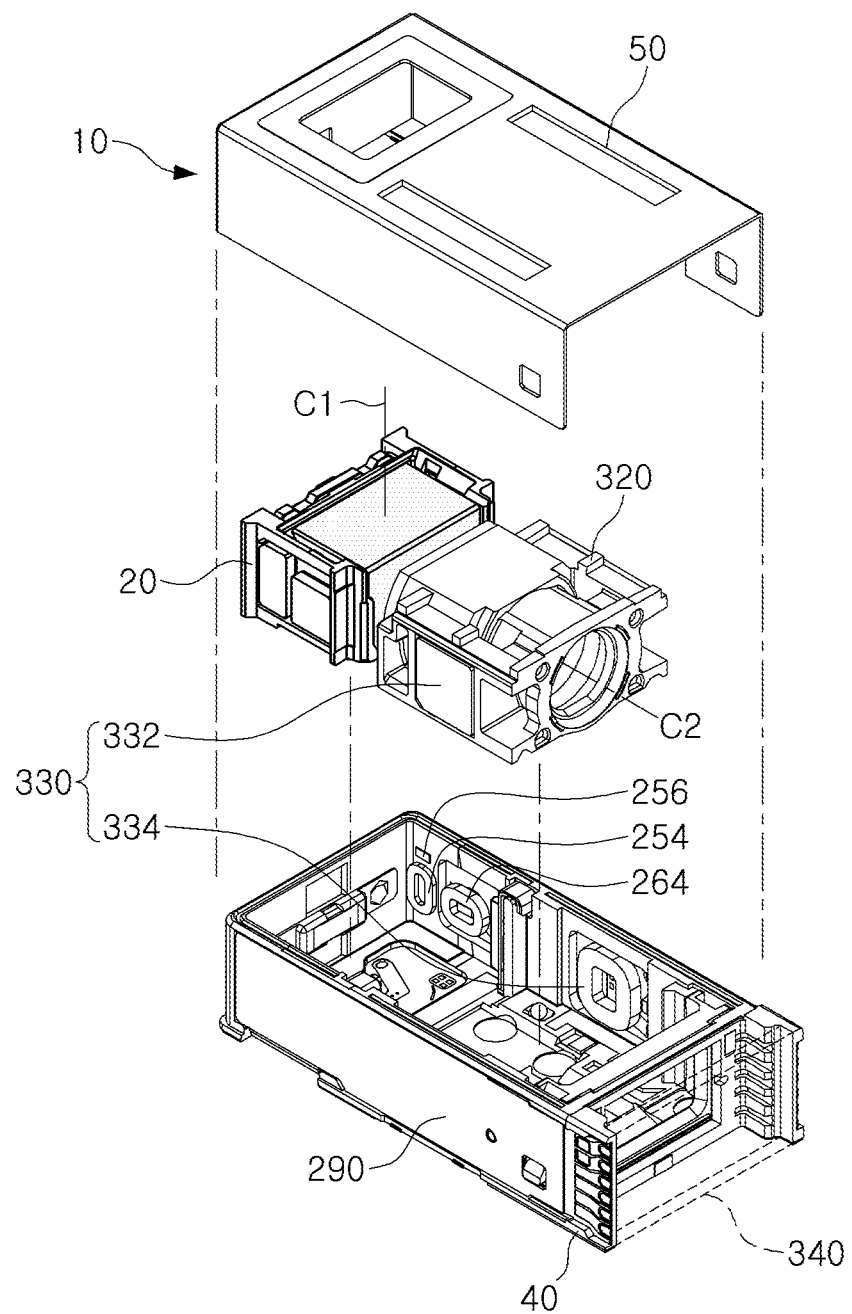
FIG. 3 illustrates an example of the optical path conversion module and the lens module, illustrated in FIG. 2.

An example of a camera module will be described in detail with reference to FIGS. 2 and 3.

A camera module 10 may be mounted on a portable terminal. For example, the camera module 10 may be mounted on portable terminal such as, for example, a mobile communication terminal, a smartphone, a wearable device, a TV, a smart appliance, a smart home device, a home appliance, a biometric door lock, a security device, various Internet of Things (IoT) devices, and a tablet PC. The camera module 10 may be configured to perform functions such as, for example, an auto focusing (AF) function, a focus magnification (Zoom) function, and an optical image stabilization (OIS) function. For example, the camera module 10 may be configured to move a lens module 30 in a direction of an optical axis.

The camera module 10 having the various functions, such as, AF function, Zoom function, and OIS function may increase in size, because various parts would have to be provided for these functions. Enlargement of the camera module 10 may hinder miniaturization of the portable terminal in which the camera module 10 is mounted. For example, a large number of lenses may be required to implement the Zoom function of the camera module, and an increase in the number of lenses may hinder thinning of the portable terminal. Similarly, in order to implement the AF and OIS functions of the camera module, a driving unit for moving a plurality of lens groups in the direction of the optical axis and in a direction intersecting the optical axis may be required, and may cause enlargement of the camera module and an increase in thickness of the portable terminal. The camera module 10 described herein may be configured not to increase in thickness and size of the portable terminal, even when containing the above-described functions. For example, the camera module 10 may lower a height of the camera module 10 due to the optical path conversion module 20. For example, a height (H) of the camera module 10 may be less than a distance (L) of the camera module 10.

The camera module 10 may include a configuration for blocking electromagnetic waves. For example, the camera module 10 may further include a shield can 50 covering at least one surface of the optical path conversion module 20, the lens module 30, and a housing 40.

The optical path conversion module 20 may be configured to convert an optical path of the camera module 10. For example, the optical path conversion module 20 may refract or reflect an optical path of light, incident in a direction of the height (H) of the camera module 10, in a direction of the distance (L) of the camera module 10.

The lens module 30 may be configured to capture an image of the light, refracted, or reflected through the optical path conversion module 20, by an image sensor 340. For example, the lens module 30 may refract light emitted from the optical path conversion module 20, to locate focus of light, incident into the camera module 10, on the image sensor 340.

The lens module 30 may include a lens barrel 320 and a third driving unit 330. The lens barrel 320 may include one or more lenses. In an example, the lens barrel 320 may include four (4) or more lenses. The third driving unit 330 may include a third driving magnet 332 and a third driving coil 334. The third driving unit 330 may be disposed on the housing 40 and the lens barrel 320. For example, the third driving magnet 332 may be disposed on a side surface of the lens barrel 320, and the third driving coil 334 may be disposed on an inner surface of the housing 40, facing the side surface of the lens barrel 320. The third driving unit 330 may drive the lens barrel 320. For example, driving force generated between the third driving magnet 332 and the third driving coil 334 may move the lens barrel 320 in a direction of a second optical axis C2. The third driving unit 330 may enable focus adjustment of the camera module 10. For example, the third driving unit 330 may move the lens barrel 320 away from the image sensor 340 or closer to the image sensor 340, to adjust focus or focus magnification of the camera module 10.

The housing 40 may be configured to accommodate the optical path conversion module 20 and the lens module 30. For example, the optical path conversion module 20 and the lens module 30 may be accommodated in an internal space of the housing 40. The housing 40 may have side surfaces open on both sides. A substrate 290 may be disposed on the open side surfaces of the housing 40.

FIGS. 4 to 8 illustrate examples of the optical path conversion module 20.

The optical path conversion module 20 may be configured to change an optical path. For example, the optical path conversion module 20 may refract or reflect light, incident along a first optical axis, in a direction of a second optical axis, intersecting the first optical axis. The optical path conversion module 20 may include an optical path converter 210 and a movable body 230. The optical path conversion module 20 may further include a configuration for driving the optical path converter 210. For example, the optical path conversion module 20 may further include a first driving unit 250, a second driving unit 260, a ball member 270, and a support member 280.

The optical path converter 210 may be configured to convert an optical path. For example, the optical path converter 210 may refract or reflect light, incident in a direction of a first optical axis C1, in a direction of a second optical axis C2. In an example, the optical path converter 210 is a prism. A shape of the optical path converter 210 is not limited to the prism. The optical path converter 210 as the prism may have a cross-sectional shape of a right-angled triangle. For example, a light-receiving surface and a light-emitting surface of the optical path converter 210 may be formed at an angle of 90 degrees, and a light-reflecting surface of the optical path converter 210 may be formed at an angle of 45 degrees with respect to the light-receiving surface and the light-emitting surface, respectively.

The movable body 230 may be configured to be disposed in the housing 40. For example, the movable body 230 may be accommodated in the internal space of the housing 40. The movable body 230 may be rotatable with respect to the housing 40. For example, the movable body 230 may rotate about a first rotation axis C3, connecting two (2) first ball members 272 (yawing). As another example, the movable body 230 may rotate about a second rotation axis C4, connecting two (4) second ball members 274 (pitching). As another example, the movable body 230 may rotate at the same time about the first rotation axis C3 and the second rotation axis C4. The first rotation axis C3 may be substantially parallel to the first optical axis C1, and the second rotation axis C4 may be a straight line, intersecting the first optical axis C1 and the second optical axis C2, respectively. In addition, the second rotation axis C4 may be in a straight line, parallel to the light-receiving surface 212 and the light-emitting surface of the prism which may be the optical path converter 210.

The optical path converter 210 may be disposed in the movable body 230. The movable body 230 may be configured to facilitate arrangement of the optical path converter

210. For example, a portion of the movable body 230 may form an inclined surface 232 to arrange the optical path converter 210.

A portion of a driving unit for driving the optical path converter 210 may be disposed in the movable body 230. For example, a first driving magnet 252 of a first driving unit 250 and a second driving magnet 262 of a second driving unit 260 may be arranged in an accommodating space 234 formed around a side surface of the movable body 230. The first driving magnet 252 may be disposed farther from the first optical axis C1, as compared to the second driving magnet 262.

Figure 5:
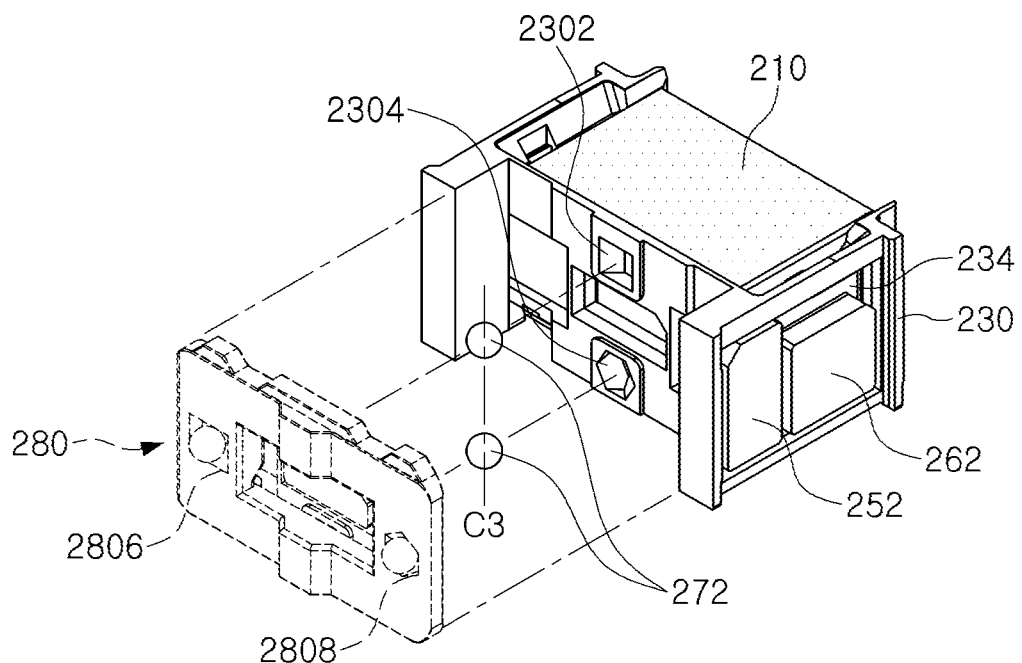
FIG. 5 illustrates an example of the movable body illustrated in FIG. 4.

As illustrated in FIG. 5, grooves 2302 and 2304 for accommodating a portion of a first ball member 272 may be formed in the movable body 230. The two grooves 2302 and 2304 may be formed to have different shapes. For example, one of the grooves 2302 and 2304 may have a square horn shape, and the other thereof may have a shape in which four (4) apex portions are cut out from a triangular horn shape. The groove 2304 having the latter shape may induce stable contact with the ball member 272. For example, the groove 2304 may always be in point contact with the ball member 272 on three surfaces, and may thus maintain the ball member 272 at a constant position, regardless of tolerance in processing of the ball member 272.

The housing 40 may be configured to accommodate the movable body 230. For example, a space for accommodating the movable body 230 may be formed in the housing 40. An internal space of the housing 40 may be configured to allow various rotational movements (yawing and pitching) of the movable body 230. For example, a length and a width of the housing 40 may be significantly greater than a length and a width of the movable body 230.

The housing 40 may be configured to smoothly transfer driving force by the first driving unit 250 and the second driving unit 260 to the movable body 230. For example, both side surfaces of the housing 40 may open to expose the magnet members 252 and 262 disposed on the movable body 230 and the coil members 254 and 264 disposed on the housing 40, respectively.

The support member 280 may be disposed between the movable body 230 and the housing 40. For example, the support member 280 may be disposed between a rear surface of the movable body 230 and an inner surface of the housing 40. The support member 280 may be configured to accommodate the plurality of ball members 272 and 274. For example, first grooves 2802 and 2804 for supporting the first ball member 272 may be formed on a front surface of the support member 280, and second grooves 2806 and 2808 for supporting the second ball member 274 may be formed on a rear surface of the support member 280.

The two first grooves 2802 and 2804 may be formed to have different shapes. For example, one of the first grooves 2802 and 2804 may have a square horn shape, and the other thereof may have a shape in which four (4) apex portions are cut out from a triangular horn shape. The first groove 2804 having the latter shape may induce stable contact with the ball member 272. For example, the first groove 2804 may always be in point contact with the ball member 272 on three surfaces, and may thus maintain the ball member 272 at a constant position, regardless of tolerance in processing of the ball member 272.

The two second grooves 2806 and 2808 may be formed to have different shapes. For example, one of the second grooves 2806 and 2808 may be a square horn shape, and the other thereof may have a shape in which four (4) apex portions are cut out from a triangular horn shape. The second groove 2808 having the latter shape may induce stable contact with the ball member 274. For example, the second groove 2808 may always be in point contact with the ball member 274 on three surfaces, and may thus maintain the ball member 274 at a constant position, regardless of tolerance in processing of the ball member 274.

Figure 4:
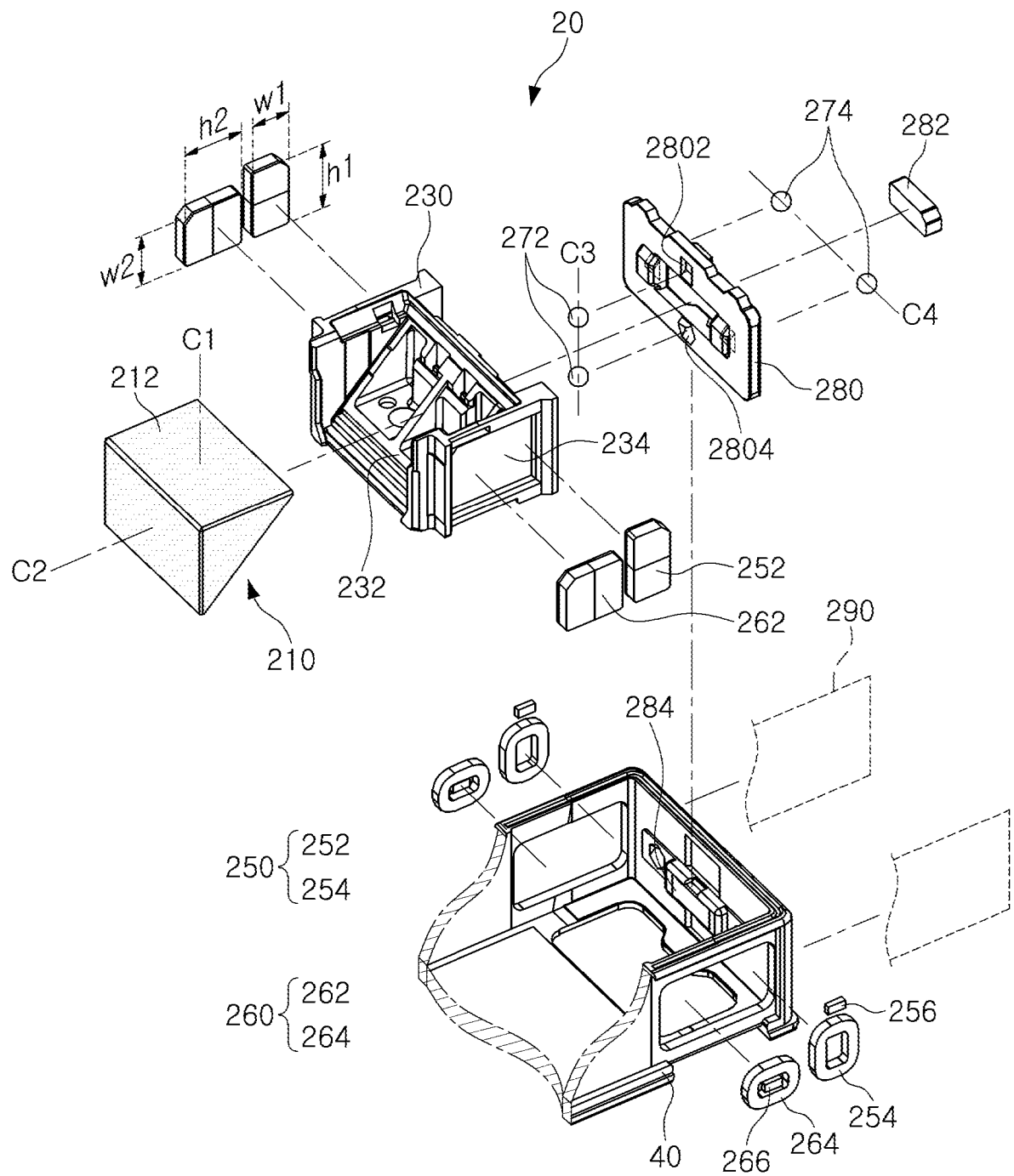
FIG. 4 illustrates an example of the optical path conversion module illustrated in FIG. 2.

The first driving unit 250 may include the first driving magnet 252 and the first driving coil 254. The first driving magnet 252 may be disposed on a side surface of the movable body 230, and the first driving coil 254 may be disposed on a side surface of the housing 40. In other words, the first driving coil 254 may be formed on the substrate 290 disposed on a side surface of the housing 40, to smoothly supply a current. The first driving magnet 252 may be polarized in a direction of the first optical axis C1. For example, a first polarity (an N pole) and a second polarity (an S pole) of the first driving magnet 252 may be sequentially formed in a direction of the first optical axis C1. One edge portion of the first driving magnet 252 may have a chamfered shape. For example, a portion adjacent to an edge portion of the accommodating space 234, among the edge portions of the first driving magnet 252, may have a chamfered shape, as illustrated in FIG. 4. The first driving magnet 252 of this type may not interfere with an inner edge of the accommodating space 234, and may be thus easily disposed on a side surface of the movable body 230.

The second driving unit 260 may include the second driving magnet 262 and the second driving coil 264. The second driving magnet 262 may be disposed on a side surface of the movable body 230, and the second driving coil 264 may be disposed on the substrate 290 disposed in the housing 40. The second driving magnet 262 may be polarized in a direction intersecting the first optical axis C1. For example, a first polarity and a second polarity of the second driving magnet 262 may be sequentially formed in a direction of the second optical axis C2. One edge of the second driving magnet 262 may have a chamfered shape. For example, a portion adjacent to an edge portion of the accommodating space 234, among the edge portions of the second driving magnet 262, may have a chamfered shape, as illustrated in FIG. 4. The second driving magnet 262 of this type may not interfere with an inner edge of the accommodating space 234, and may be thus easily disposed on a side surface of the movable body 230.

The first driving magnet 252 and the second driving magnet 262 may have different sizes. For example, a distance (h1) of the first driving magnet 252 in a polarization direction may be greater than a distance (h2) of the second driving magnet 262 in a polarization direction. As another example, the distance (h1) of the first driving magnet 252 in the polarization direction may be greater than a width (w2) of the second driving magnet 262 (a magnitude thereof in a direction intersecting the polarization direction). A magnitude of the first driving magnet 252 may not be necessarily different from a magnitude of the second driving magnet 262. In another example, the first driving magnet 252 and the second driving magnet 262 may be formed to have the same length and width. The first driving unit 250 may generate driving force required for first rotational motion (pitching) of the movable body 230, and the second driving unit 260 may generate driving force required for second rotational motion (yawing) of the movable body 230.

The optical path conversion module 20 may further include a means for detecting a position of the optical path converter 210. For example, as illustrated in FIG. 4, the optical path conversion module 20 may further include a first position detecting sensor 256 and a second position detecting sensor 266. The first position detecting sensor 256 may be disposed outside the first driving coil 254, to reduce a hole coupling phenomenon. A position of the first position detecting sensor 256 may be limited by a size of the first driving magnet 252. For example, the first position detecting sensor 256 may be disposed to oppose an end portion of the first driving magnet 252. The second position detecting sensor 266 may be disposed in a central portion of winding of the second driving coil 264. Position of the second position detecting sensor 266 is not limited to the central portion of winding of the second driving coil 264, and the second position detecting sensor 266 could be disposed in other positions relative to the second driving coil 264.

The camera module 10 may include a means for maintaining a distance between the optical path conversion module 20 and the housing 40. For example, as illustrated in FIG. 4, the camera module 10 may include a first magnetic body and a second magnetic body. The first magnetic body and the second magnetic body may be configured in a form of a magnet and a yoke, or in a form of a magnet and a magnet. For reference, in this embodiment, the first magnetic body is a magnet member 282, and the second magnetic body is a yoke member 284. The magnet member 282 may be disposed on the movable body 230. For example, the magnet member 282 may be disposed on the rear surface of the movable body 230, to protrude toward the housing 40. The yoke member 284 may be disposed in the housing 40. For example, the yoke member 284 may be formed, to protrude from an internal space of the housing 40 to oppose the magnet member 282. The magnet member 282 and the yoke member 284 may interact with each other to generate attractive force of a predetermined magnitude. The attraction force formed by the magnet member 282 and the yoke member 284 may suppress a phenomenon that the movable body 230 is detached from the housing 40. In more detail, after rotational movement of the movable body 230 by the first driving unit 250 and the second driving unit 260, the magnet member 282 and the yoke member 284 may function to return the movable body 230 to a first position thereof. The magnet member 282 and the yoke member 284 may also prevent the movable body 230 from deviating from the housing 40 during the rotational movement of the movable body 230 by the first driving unit 250 and the second driving unit 260.

Figure 6:
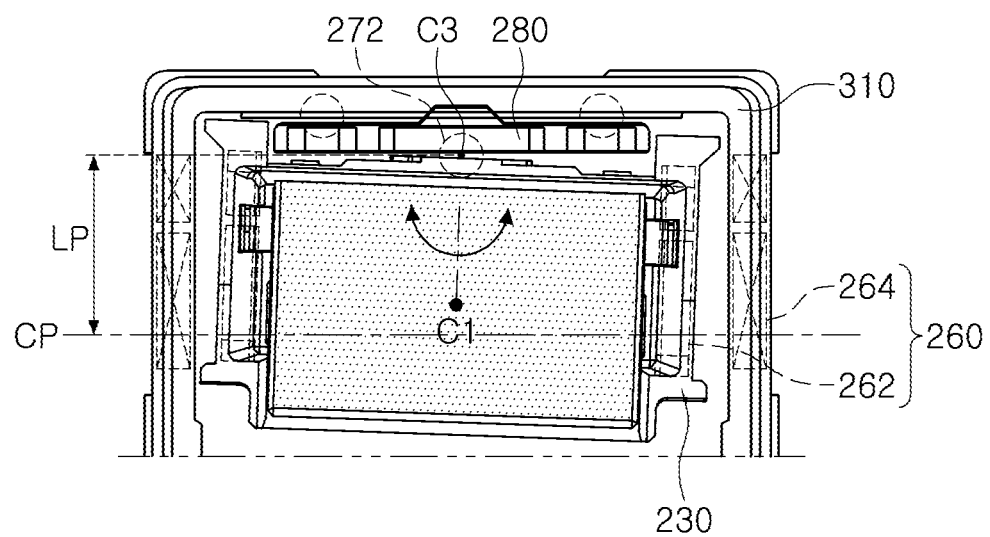
FIG. 6 illustrates an example of an operational state diagram of the movable body illustrated in FIG. 5.
Figure 7:
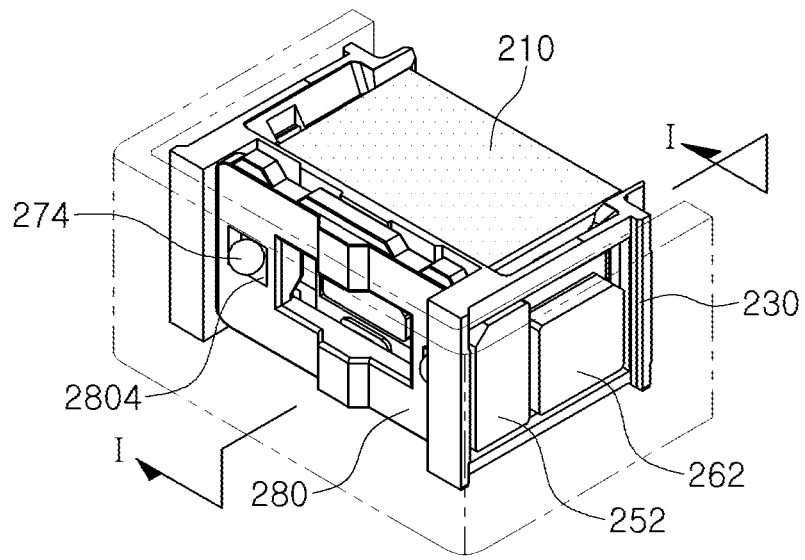
FIG. 7 illustrates an example of a movable body coupled with a support member for a rolling member.
Figure 8:
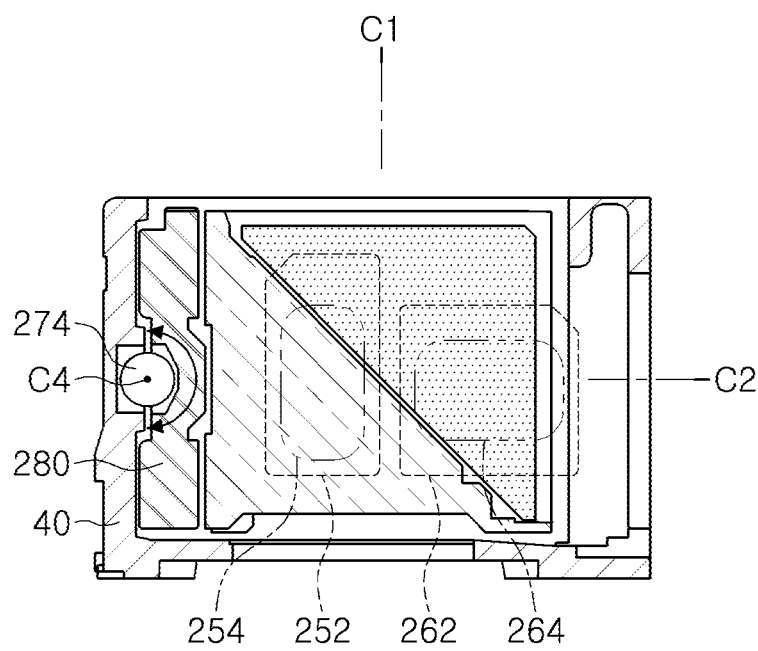
FIG. 8 illustrates an example of an operation state diagram of the movable body illustrated in FIG. 7.

FIGS. 6 to 8 illustrate examples of an operating state of an optical path conversion module.

An optical path conversion module 20 may be configured to enable rotational movement of an optical path converter 210. For example, the optical path conversion module 20 may move the optical path converter 210 to take a photo or a video of a certain quality, even when a camera module is affected by user handshake or trembling due to an external shock.

For example, the optical path conversion module 20 may rotate a movable body 230 on which the optical path converter 210 is disposed, based on a first rotation axis C3, as illustrated in FIG. 6. For example, the movable body 230 may rotate about the first rotation axis C3 in a clockwise direction or in a counterclockwise direction. Driving force required for rotation of the movable body 230 may be provided from a second driving magnet 262 and a second driving coil 264. A virtual straight line CP connecting the second driving magnet 262 and the second driving coil 264 may be formed to be spaced apart from the first rotation axis C3 for a predetermined separation distance (LP). In an example, the separation distance (LP) may be formed to be greater than a distance between the first rotation axis C3 and a first optical axis C1. Therefore, the first driving unit 250 may rotate the optical path converter 210 around the first rotation axis C3 even with a relatively small amount of driving force.

As another example, as illustrated in FIG. 8, the optical path conversion module 20 may rotate the movable body 230, on which the optical path converter 210 is disposed, about a second rotation axis C4. For example, the movable body 230 may rotate around the second rotation axis C4 connecting a second ball member 274 in a vertical direction. Driving force required for rotation of the movable body 230 may be provided from the first driving magnet 252 and the first driving coil 254.

Figure 9:
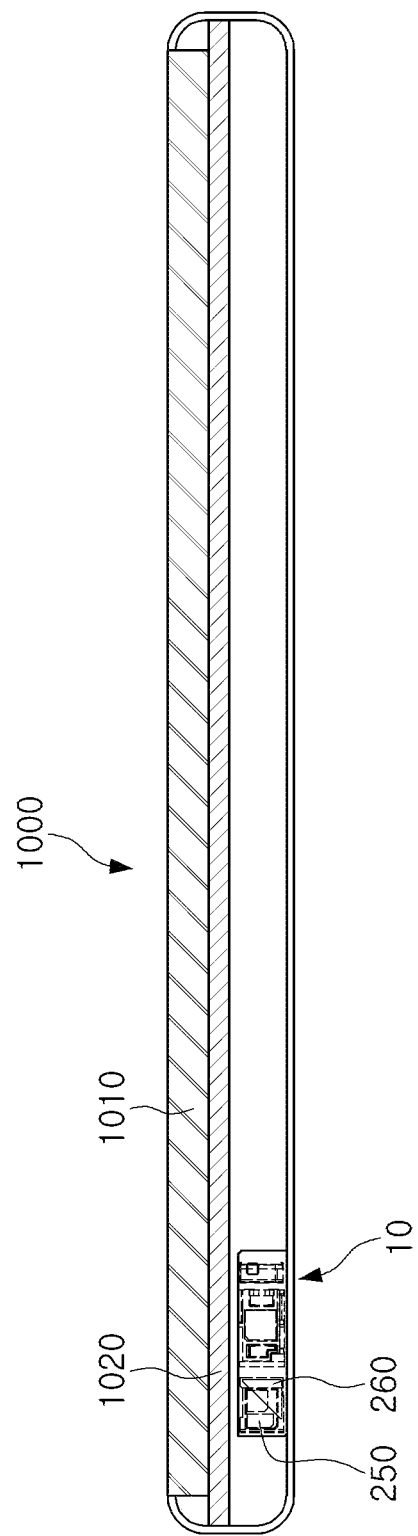
FIG. 9 illustrates an example of a portable terminal having a camera module.

The camera module 10 may be mounted on a portable terminal 1000, as illustrated in FIG. 9. The portable terminal 1000 may be a device capable of performing wireless communications. For example, the portable terminal 1000 may be provided as a wireless telephone. The portable terminal 1000 may include a liquid crystal screen 1010 capable of providing a user with a photo and a video taken by a camera module 10 in real-time. A magnetic field shielding plate 1020 made of a metal material may be disposed on a side surface of the liquid crystal screen 1010. The magnetic field shielding plate 1020 made of a metal material may have a large or small influence on a driving device using magnetic force. Since a camera module 10 described herein has a configuration in which driving units 250 and 260 are arranged in a lateral direction of an optical path converter 210, the portable terminal 1000 is less susceptible to interference by the magnetic field shielding plate 1020. Therefore, the camera module 10 described herein is precisely driven, even when mounted in the portable terminal 1000.

Another example of the optical path conversion module will be described with reference to FIGS. 10 to 14. For reference, in the description below, the same elements as in the above-described embodiment will use the same reference numerals as in the above-described embodiment, and detailed description of the same elements will be omitted for brevity.

An optical path conversion module 20 according to this embodiment may be distinguished from those of the above-described embodiment, in terms of arrangement of a first driving unit 250 and a second driving unit 260. For example, in this embodiment, the first driving unit 250 may be disposed closer to a first optical axis C1, compared to the second driving unit 260.

Figure 10:
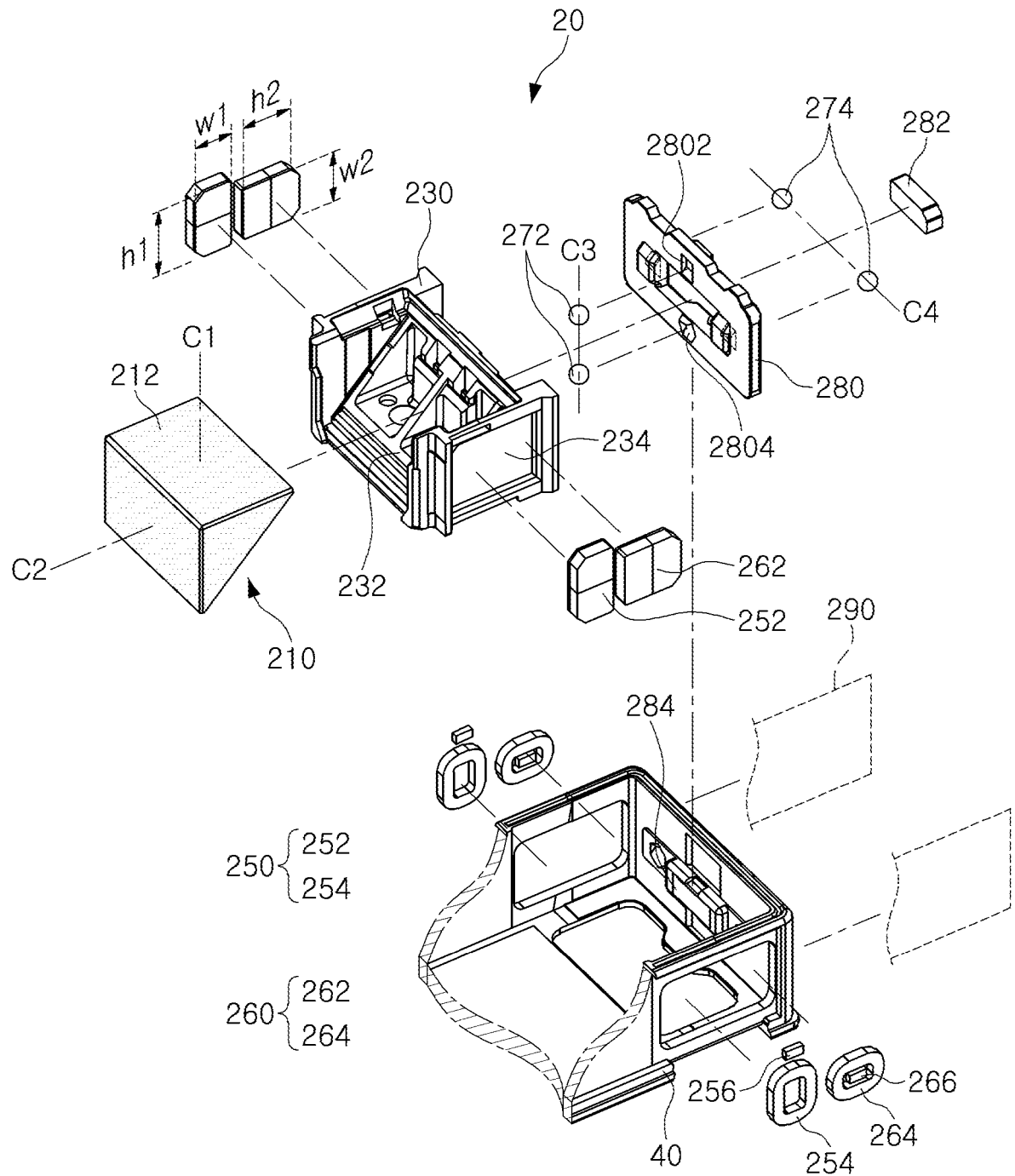
FIG. 10 illustrates an example of an optical path conversion module.
Figure 11:
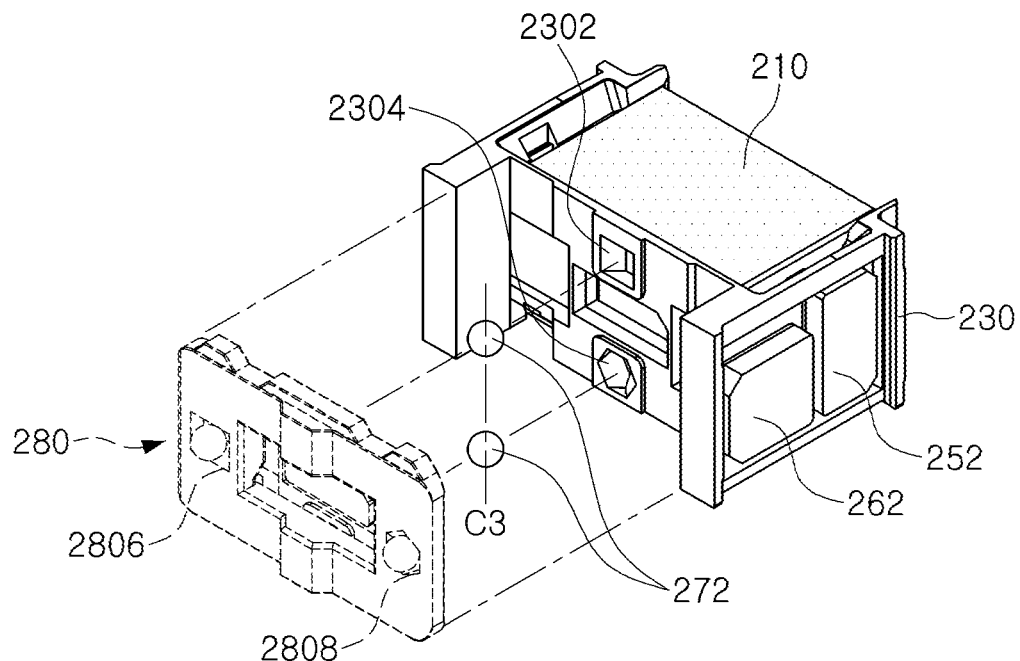
FIG. 11 illustrates an example of the movable body illustrated in FIG. 10.

The first driving unit 250 may include a first driving magnet 252 and a first driving coil 254. The first driving magnet 252 may be disposed on a side surface of a movable body 230, and the first driving coil 254 may be formed on a substrate 290 disposed on a side surface of a housing 40. The first driving magnet 252 may be polarized in a direction of the first optical axis C1. For example, a first polarity and a second polarity of the first driving magnet 252 may be arranged in a direction of the first optical axis C1. One edge of the first driving magnet 252 may have a chamfered shape. In another example, two (2) edges of the first driving magnet 252, adjacent to an edge portion of an accommodating space 234 of the movable body 230, may have a chamfered shape, as illustrated in FIG. 10.

The second driving unit 260 may include a second driving magnet 262 and a second driving coil 264. The second driving magnet 262 may be disposed on a side surface of the movable body 230, and the second driving coil 264 may be disposed on the substrate 290 disposed in the housing 40. The second driving magnet 262 may be polarized in a direction intersecting the first optical axis C1. For example, a first polarity and a second polarity of the second driving magnet 262 may be arranged in a direction of a second optical axis C2. One edge of the second driving magnet 262 may have a chamfered shape. In another example, two (2) edges of the second driving magnet 262, adjacent to an edge portion of an accommodating space 234 of the movable body 230, may have a chamfered shape, as illustrated in FIG. 10.

The first driving magnet 252 and the second driving magnet 262 may have different sizes. For example, a distance (h1) of the first driving magnet 252 in a polarization direction may be greater than a distance (h2) of the second driving magnet 262 in a polarization direction. As another example, the distance (h1) of the first driving magnet 252 in the polarization direction may be greater than a width (w2) of the second driving magnet 262 (a magnitude thereof in a direction intersecting the polarization direction). A magnitude of the first driving magnet 252 may not be necessarily different from a magnitude of the second driving magnet 262. In an example, the first driving magnet 252 and the second driving magnet 262 may be formed to have the same length and width.

An operating state of an optical path conversion module will be described with reference to FIGS. 12 and 14.

An optical path conversion module 20 may be configured to enable rotational movement of an optical path converter 210. For example, the optical path conversion module 20 may move the optical path converter 210 to take a photo or a video of a certain quality, even when a camera module is affected by user handshake or trembling due to an external shock.

Figure 12:
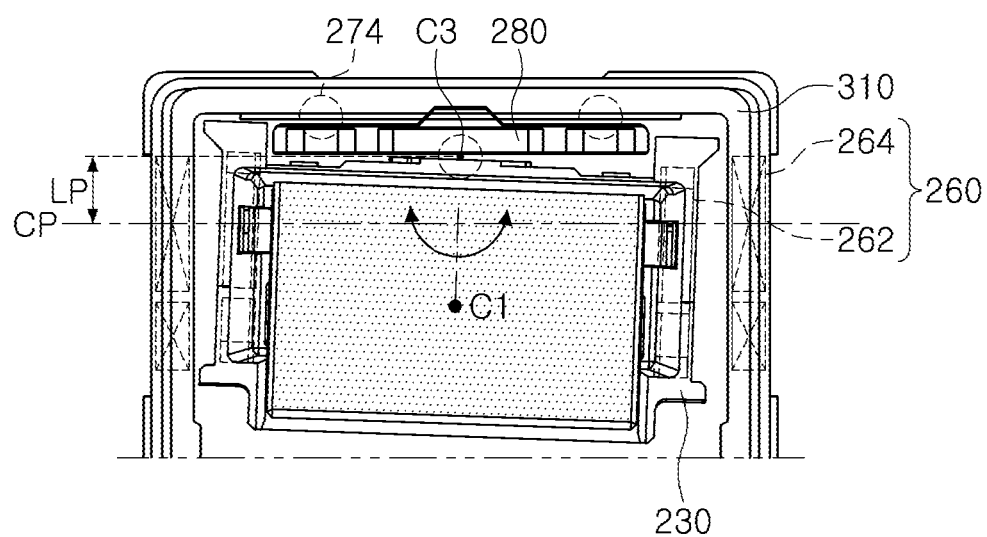
FIG. 12 illustrates an example of an operation state diagram of the movable body illustrated in FIG. 10.
Figure 13:
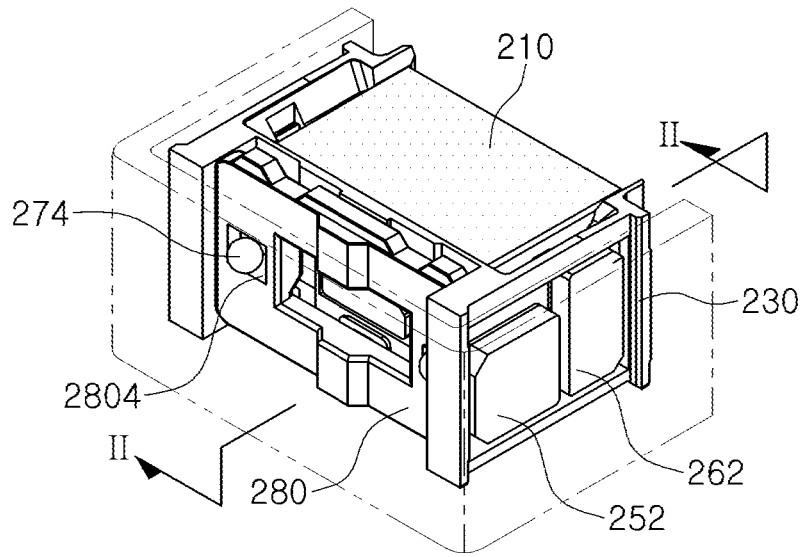
FIG. 13 illustrates an example of a movable body coupled with a support member for a ball member.

For example, the optical path conversion module 20 may rotate a movable body 230 on which the optical path converter 210 is disposed, based on a first rotation axis C3, as illustrated in FIG. 12. For example, the movable body 230 may rotate about the first rotation axis C3 in a clockwise direction or in a counterclockwise direction. Driving force required for rotation of the movable body 230 may be provided from a second driving magnet 262 and a second driving coil 264. A virtual straight line CP connecting the second driving magnet 262 and the second driving coil 264 may be formed to be spaced apart from the first rotation axis C3 for a predetermined separation distance (LP). The separation distance (LP) may be formed to be greater than a distance between the first rotation axis C3 and a first optical axis C1.

Figure 14:
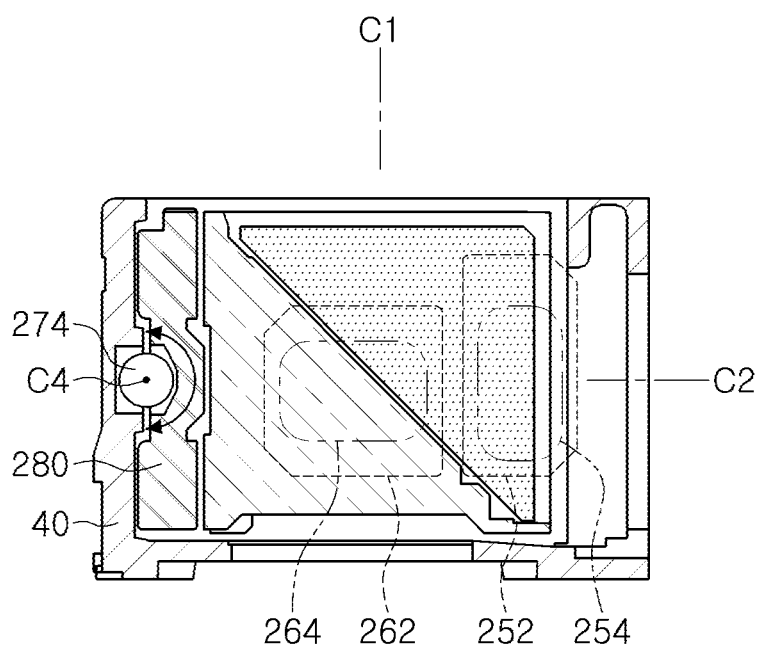
FIG. 14 illustrates an example of an operation state diagram of the movable body illustrated in FIG. 13.

As another example, as illustrated in FIG. 14, the optical path conversion module 20 may rotate the movable body 230, on which the optical path converter 210 is disposed, about a second rotation axis C4. For example, the movable body 230 may rotate around the second rotation axis C4 connecting a second ball member 274 in a vertical direction. Driving force required for rotation of the movable body 230 may be provided from the first driving magnet 252 and the first driving coil 254.

For reference, the first rotation axis C3 may be a straight line substantially parallel to the first optical axis C1, and the second rotation axis C4 may be a straight line intersecting the first optical axis C1 or the first rotation axis C3.

Figure 15:
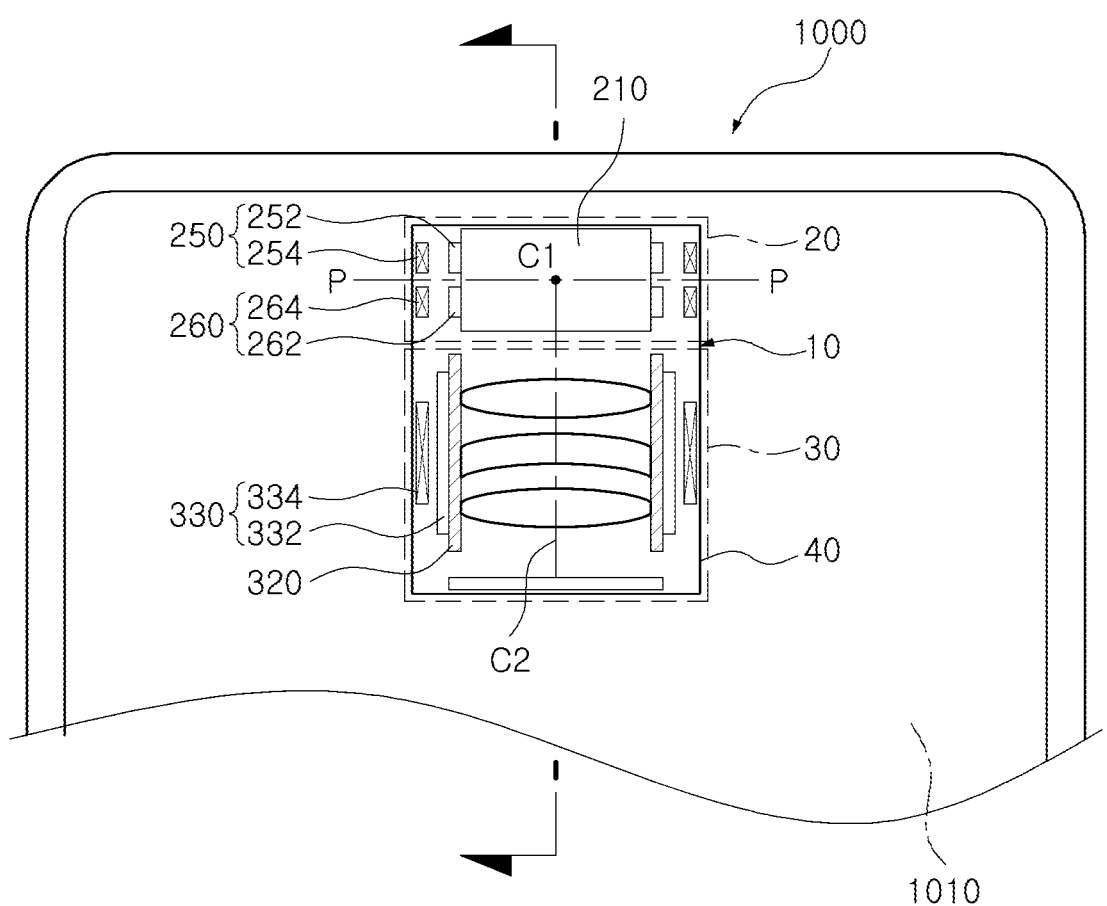
FIG. 15 illustrates an example of a configuration diagram of a portable terminal.
Figure 16:
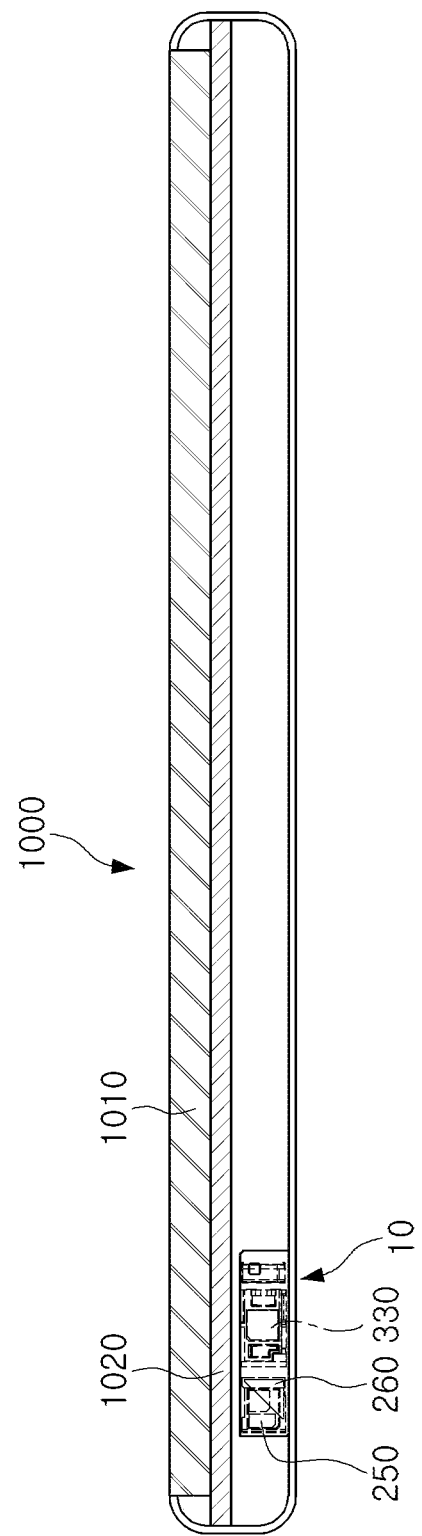
FIG. 16 illustrates an example of a cross-sectional view of the portable terminal illustrated in FIG. 15.

FIGS. 15 and 16 illustrate an example of a portable terminal.

A portable terminal 1000 may include a camera module 10 and a liquid crystal screen 1010. A configuration of the portable terminal 1000 is not limited to the camera module 10 and the liquid crystal screen 1010. For example, the portable terminal 1000 may further include an antenna for wireless communications, and a communications module for transmitting and receiving a wireless signal.

The liquid crystal screen 1010 may be disposed on a side surface of the portable terminal 1000. For example, the liquid crystal screen 1010 may be disposed on a front surface of the portable terminal 1000. The liquid crystal screen 1010 may be generally formed to have a thin flat plate shape. The liquid crystal screen 1010 may be configured to provide image information to a user of the portable terminal 1000. For example, the liquid crystal screen 1010 may visually provide a photo and a video captured by the camera module 10. A magnetic field shielding plate 1020 made of a metal material may be disposed on a side surface of the liquid crystal screen 1010.

The camera module 10 may be disposed on the other side surface of the portable terminal 1000. For example, the camera module 10 may be disposed on a rear side surface of the portable terminal 1000. A position of the camera module 10 to be arranged is not limited to the rear surface of the portable terminal 1000. For example, the camera module 10 may be disposed on the front surface of the portable terminal 1000, or may be disposed on the front and rear surfaces of the portable terminal 1000. The camera module 10 may be configured to capture images of a landscape, a person, and the like, located around the portable terminal 1000.

The camera module 10 may include an optical path conversion module 20, a lens module 30, and a housing 40. The camera module 10 may include a first driving unit 250, a second driving unit 260, and a third driving unit 330. The first driving unit 250 may be configured to rotate an optical path converter 210 of the optical path conversion module 20 around a first optical axis C1. The first driving unit 250 may include a first driving magnet 252 and a first driving coil 254. The first driving magnet may be configured to form a first polarity and a second polarity in a direction of the first optical axis C1. The second driving unit 260 may be configured to rotate the optical path converter 210 around an axis P, intersecting the first optical axis C1 and a second optical axis C2. The second driving unit 260 may include a second driving magnet 262 and a second driving coil 264. The third driving unit 330 may be configured to move a lens barrel 320 in a direction of the second optical axis C2. The third driving unit 330 may include a third driving magnet 332 and a third driving coil 334. The first driving magnet 252 and the second driving magnet 262 may have a predetermined size relationship. For example, a distance of the first driving magnet 252 extending in a direction of the first optical axis may be greater than a distance of the second driving magnet 262 extending in a direction of the first optical axis. As another example, a distance of the second driving magnet 262 extending in a direction of the second optical axis may be greater than a distance of the first driving magnet 252 extending in a direction of the second optical axis (see FIGS. 4 and 9).

The portable terminal 1000 may be configured to arrange the driving units 250, 260, and 330 on a plane, intersecting the liquid crystal screen 1010. For example, the driving coils 254, 264, and 334 of the driving units 250, 260, and 330 may be disposed on a side surface of the housing 40, intersecting the liquid crystal screen 1010. As another example, the driving magnets 252, 262, and 332 of the driving units 250, 260, and 330 may be disposed on a side surface of the optical path conversion module 20 and a side surface of the lens barrel 320, intersecting the liquid crystal display 1010.

Since, in the portable terminal 1000, configured as above, the driving units 250, 260, and 330 may be arranged at a predetermined distance from the liquid crystal screen 1010 and the magnetic field shielding plate 1020, magnetic field interference between the driving units 250, 260, and 330, and the liquid crystal display 1010 and the magnetic field shielding plate 1020 may be minimized.

In addition, since a portable terminal 1000 may be disposed on a plane (i.e., a side surface of the portable terminal 1000) in which the driving units 250, 260, and 330 intersect the liquid crystal screen 1010, the portable terminal 1000 may be easy to designed to be thinner.

An optical path conversion module, a camera module, and a portable terminal, according to the present disclosure, may precisely drive a prism without magnetic field interference by an external component.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical path conversion module, comprising:
   an optical path converter configured to reflect or refract light, incident along a first optical axis, in a direction of a second optical axis, intersecting the first optical axis;
   a first driving unit disposed on a side surface of the optical path converter, and configured to generate a driving force to rotate the optical path converter about a first rotation axis, intersecting the second optical axis;
   a second driving unit disposed on the side surface of the optical path converter, and configured to generate a driving force to rotate the optical path converter about a second rotation axis, intersecting the second optical axis; and
   a first position sensor disposed outside of a driving coil of the first driving unit and a second position sensor disposed inside of a driving coil of the second driving unit,
   wherein an edge portion of a first driving magnet of the first driving unit is configured to have a chamfered shape,
   wherein the first driving magnet is polarized along a first direction and a second driving magnet of the second driving unit is polarized along a second direction that intersects the first direction, and
   wherein a length of the first driving magnet along the first direction is greater than a width of the second driving magnet along the second direction.

2. The optical path conversion module of claim 1, wherein the first driving unit and the second driving unit are arranged on the side surface of the optical path converter in parallel.

3. The optical path conversion module of claim 1, wherein the first driving unit and the second driving unit are arranged to provide a driving force to the optical path converter in a direction, intersecting the first optical axis and the second optical axis.

4. The optical path conversion module of claim 1, wherein the first driving unit comprises the first driving magnet in which a first polarity and a second polarity are formed in a direction of the first optical axis.

5. The optical path conversion module of claim 1, wherein the second driving unit comprises the second driving magnet in which a first polarity and a second polarity are formed in a direction of the second optical axis.

6. The optical path conversion module of claim 1, wherein the first driving magnet of the first driving unit extends further than the second driving magnet of the second driving unit in a direction of the first optical axis.

7. The optical path conversion module of claim 1, wherein the second driving magnet of the second driving unit extends further than the first driving magnet of the first driving unit in a direction of the second optical axis.

8. The optical path conversion module of claim 1, further comprising:
   a movable body configured to accommodate the optical path converter and to be rotated by the first driving unit and the second driving unit; and
   a fixed body configured to accommodate the movable body.

9. The optical path conversion module of claim 8, further comprising a support member disposed between the movable body and the fixed body.

10. The optical path conversion module of claim 9, further comprising a first ball member disposed between the movable body and the support member, and disposed at an interval in a direction of the first optical axis.

11. The optical path conversion module of claim 9, further comprising a second ball member disposed between the fixed body and the support member, and disposed at an interval in a direction intersecting the first optical axis and the second optical axis.

12. The optical path conversion module of claim 9, further comprising a first magnetic body and a second magnetic body configured to generate attractive force between the movable body and the fixed body, the first magnetic body and the second magnetic body being respectively formed on the movable body and the fixed body with the support member interposed therebetween.

13. The optical path conversion module of claim 12, wherein the first magnetic body and the second magnetic body include a yoke and a magnet.

14. A camera module, comprising:
   an optical path conversion module comprising:
     an optical path converter configured to reflect or refract light, incident along a first optical axis, in a direction of a second optical axis, intersecting the first optical axis,
     a first driving unit disposed on a side surface of the optical path converter, and configured to generate a driving force to rotate the optical path converter about a first rotation axis, intersecting the second optical axis,
     a second driving unit disposed on the side surface of the optical path converter, and configured to generate a driving force to rotate the optical path converter about a second rotation axis, intersecting the second optical axis;
   a lens module including one or more lenses; and
   a first position sensor disposed outside of a driving coil of the first driving unit and a second position sensor disposed inside of a driving coil of the second driving unit, wherein an edge portion of a first driving magnet of the first driving unit is configured to have a chamfered shape, wherein the first driving magnet is polarized along a first direction and a second driving magnet of the second driving unit is polarized along a second direction that intersects the first direction, and wherein a length of the first driving magnet along the first direction is greater than a width of the second driving magnet along the second direction.

15. A portable terminal, comprising:

a liquid crystal screen configured to provide image information; and a camera module comprising:

an optical path converter configured to emit light, incident along a first optical axis, in a direction of a second optical axis, intersecting the first optical axis;

a first driving unit configured to rotate the optical path converter about the first optical axis or about a first rotation axis, parallel to the first optical axis;

a second driving unit configured to rotate the optical path converter about the first optical axis or about a second rotation axis, intersecting the first rotation axis;

a first position sensor disposed outside of a driving coil of the first driving unit; and a second position sensor disposed inside of a driving coil of the second driving unit, wherein a first driving magnet of the first driving unit and a second driving magnet of the second driving unit are arranged in a plane intersecting the liquid crystal screen, the first driving magnet being polarized along a first direction and the second driving magnet being polarized along a second direction that intersects the first direction, wherein an edge portion of a first driving magnet of the first driving unit is configured to have a chamfered shape, and wherein a length of the first driving magnet along the first direction is greater than a width of the second driving magnet along the second direction.

* * * * *